(12) United States Patent
van Duynhoven

(10) Patent No.: US 6,358,563 B1
(45) Date of Patent: Mar. 19, 2002

(54) LUMINESCENT SIGNAGE

(76) Inventor: Debra May van Duynhoven, 95 Seward St., San Francisco, CA (US) 94114

( * ) Notice: Subject to any disclaimer, the term of this patent is extended or adjusted under 35 U.S.C. 154(b) by 0 days.

(21) Appl. No.: 09/584,482

(22) Filed: Jun. 1, 2000

Related U.S. Application Data

(60) Provisional application No. 60/138,025, filed on Jun. 8, 1999, and provisional application No. 60/168,647, filed on Dec. 3, 1999.

(51) Int. Cl.[7] .................................................. B05D 5/00
(52) U.S. Cl. ......................... 427/282; 427/64; 427/137; 427/157
(58) Field of Search ................................ 427/137, 157, 427/158, 282, 64

(56) References Cited

U.S. PATENT DOCUMENTS

| | | | | | |
|---|---|---|---|---|---|
| 4,025,476 A | * | 5/1977 | Miller et al. | ............ | 260/22 CQ |
| 5,665,793 A | * | 9/1997 | Anders | ........................ | 523/172 |
| 5,843,534 A | * | 12/1998 | Chang et al. | ................ | 427/282 |

* cited by examiner

*Primary Examiner*—Brian K. Talbot

(57) ABSTRACT

This invention relates to self-luminescent signage and indicia, particularly suited to architectural applications. This invention uses stencils, or other guiding devices, an applicator and an alkali earth oxide aluminate luminescent paint to create indicia that absorb ambient light and emit it in the darkness. This eliminates the need for separately powered emergency signage or other luminescent or illuminated indicia.

4 Claims, 1 Drawing Sheet

Sample Stencil Outline

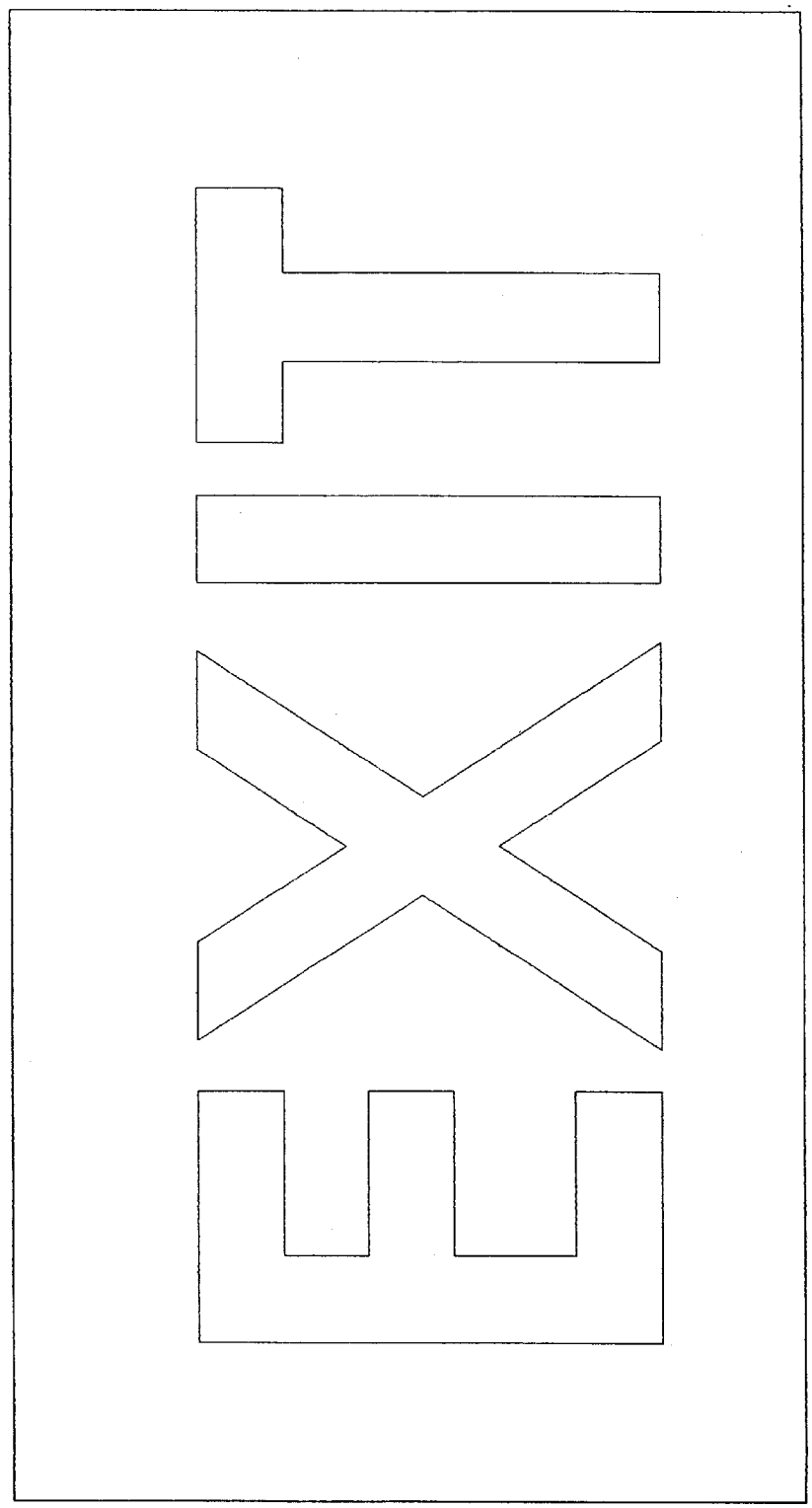
Sample Stencil Outline

LUMINESCENT SIGNAGE

This application claims benifit of Provisional Ser. No. 60/138,025 filed Jun. 8, 1999 and Ser. No. 60/168,647 filed Dec. 3, 1999.

BACKGROUND—FIELD OF THE INVENTION

This invention relates to self-luminescent signage and indicia, particularly suited to architectural applications. This invention uses stencils, or other guiding devices, and a novel composition of luminescent paint that may be exposed to light, either natural or artificial, for a specific minimum amount of time, before giving off light for a specific and measurable amount of time and level of luminosity as dictated by the luminescent paint. This invention will enable individuals to easily install and maintain signs and indicia that emit their own light in a darkened scenario.

BACKGROUND—DESCRIPTION OF PRIOR ART

Lighted signs are common in many applications. Known applications include emergency exit signs for buildings, addresses on houses and warning and directional or waning signage in industrial locations. For these applications, the signage is be lighted so that it is visible in darkness. To that end, such signs are often provided with back-up electrical supplies so that they are not affected by a general power failure. These signs are consequently expensive to make and expensive to install, as they generally require a power source, in addition to at least one lamp. Furthermore, they include parts, which fail from time to time, such as batteries and light bulbs, and so require periodic maintenance. Examples of these signs include "EXIT" signs.

Reflective signage is also known. These signs reflect ambient light, and have applications where, for example, users have a light source such a flashlight available to them. They are also used for applications to guide lighted machinery, such as automobiles. Although these signs require little maintenance, and are not expensive, they are not helpful where users do not have their own light sources available. Examples of these signs are common roadside traffic signs.

There is thus a need for signs and indicia that emit their own light, but which are inexpensive and easy to install and maintain.

Luminescent signs have been proposed, and are made of luminescent sheet material or PVC. These must be precut and preprinted. They are then attached to a support or device to be installed.

In general, the luminescent pigments used in these and other such devices provide a certain amount of light after they in turn have been exposed to light for a certain period. Examples of luminescent pigments include, among others, zinc sulfide and alkali metal oxide aluminates. The alkali metal oxide aluminates are sensitive to water, and can degrade quickly when exposed to moisture.

U.S. Pat. No. 5,874,491 relates to phosphorescent highway paint incorporating this type of phosphor. Although this paint formulation states that it provides indicia (highway lines) it suffers from the problems that: 1) it is not tintable to a selected color and 2) the paint would not be suitable for interior walls, and would not apply as easily as normal paint. Anders stated that they may provide the product in bright yellows and reds, which are traditionally used in highway markings, although we have found that the stronger or deeper colors absorb the luminosity and therefore are not that effective. In addition, the coloration of his paint is not by the standard process of adding tints as required at a store, but by adding pigments at the manufacturing level. Finally because of the required encapsulation step in Anders' paint it is difficult to incorporate a substantial amount of the phosphor (luminescent pigment) into a paint thereby reducing the amount it can glow.

In addition, the typical rheology of the product is jeopardized, most likely making it very difficult to use.

BRIEF SUMMARY OF THE INVENTION

I have found that luminescent signs and indicia can be simply and easily made from a quality luminescent coating formulation, which includes a luminescent pigment, a method of application, and a stencil or guiding device.

My signs and indicia provide adequate light for emergency application, and require no electrical supply to illuminate them for up to several hours. They are relatively inexpensive and easy to install and require little maintenance. They are resistant to moisture. They are readable in low, ambient light and in the dark. They are flexible in application, as they may be painted onto any surface, any where.

I have also provided a kit for making signs and indicia, which includes a luminescent coating formulation, a stencil, and preferably an applicator.

The composition of the coating formulation of my invention is, in general, as disclosed in co-pending provisional application No. 60/138025 (Tintable Luminescent Paint). This invention could also use other luminescent coatings, which are industry or application specific.

Preferably, as disclosed in the co-pending patent application, the paint includes an alkali earth (barium, calcium, strontium) oxide aluminate pigment of acceptable color and particle size. This type of phosphorescent pigment is sold under the trademark Luminova, by United Mineral and Chemical Corporation, from New Jersey.

In the co-pending patent application, these pigments are mixed with an oil-based alkyd coating product, or a polyurethane base. Other pigments, such as titanium dioxide, and tints, may be added to increase legibility or improve the appearance of the signs either under light or in the dark. Rheology modifiers, anti-skinning agents, drying agents, leveling agents, and the like are added to suspend the relatively dense phosphorescent material in the base, and to improve the appearance of the final product.

The signs will, in general, meet the requirements of many standards and building codes in that they are bright enough to be visible as exit signs and of course may be part of an emergency egress indication system, including not only the exit signage but also indicator stripes, doorway markings, stairway and lighting indication, and the like.

This invention also relates to other stenciled luminescent signs for such applications such as storefronts, designs, temporary, directional and instructional signs in and around buildings or built environments.

This invention also relates to using the luminescent paint and guiding device to mark, indicate or outline such items like fire hose cabinets, door frames, dangerous obstructions, light switch plates, electrical outlets, etc.

This invention also relates to a kit comprising of paint and a stencil. The paint is luminescent and the stencil is a standard piece of plastic that is cut out where the area will is to receive the luminescent paint. This includes stencils designed for emergency exits, numbers, directional arrows, pictograms and other specific designs and words. The luminescent paint can be applied by brush, roller or spray device.

In addition, the luminescent paint in the resultant signage could be the same color as the non luminescent paint, so that the sign would then only be visible in a darkened scenario.

The benefit that the luminescent paint, as discussed below, can be tintable at the local store in a traditional fashion, which would allow the novel aspect of having the sign virtually disappear in a light scenario and visibly glow in darkened one.

DETAILED DESCRIPTION

The Signs

The signs are made by using the stencil to paint directly on to the surface where the signs are required, or of course, it could be painted onto a panel and then installed in the appropriate place. The usual surface preparation typical of paint is required. Preferably, a stencil is used to provide uniformity to the signage, image or design. An example of a stencil is shown in Drawing 1. The stencil is attached to the surface by some form of attachment: tack, clip, tape, etc, or simply by holding it in place by hand. The paint applied over the stencil may be applied by roller or brush, or in some circumstances by spray device. Additionally a guiding device such as a straight edge or other such tool may aid in the design, implementation and production of the sign.

The luminescent paints of this invention must be exposed to light, as they operate by absorption energy from light than radiate that energy. In general, a bright light source will saturate the pigment within a period of at least fifteen minutes, and the resulting radiance will last from a few minutes to several hours, depending on the amount of phosphorescent pigment in the coating. The preference is for longer lasting radiance.

The signs will, in general, meet the requirements of many standards and building codes in that they are bright enough to be visible as exit signs and of course may be part of an emergency egress indication system, including not only the exit signage but also indicator stripes, doorway markings, stairway and lighting indication, and the like. This invention also relates to other stenciled luminescent signs for such applications such as storefronts, designs, temporary, directional and instructional signs in and around buildings or built environments. This invention also relates to using the luminescent paint and guiding device to mark, indicate or outline such items like fire hose cabinets, door frames, dangerous obstructions, light switch plates, etc.

Alternative luminescent coatings, which may be industry or application specific like an epoxy, latex, etc., can be used if required, although these alternative coatings may not have the same characteristics or qualities with respect to luminosity and application. The coating formulation, as outlined below, is far superior for stencil applications.

The Coating Formulation

A preferred coating formulation as disclosed in co-pending patent application, is made by the following method:

Charge a mixing vessel under a high speed disperser fitted with a Cowles blade with:

Wallkyd 11-029 14.0

Start the disperser at 3,500 rpm and add:

RILANIT SPECIAL M 0.76

Disperse for 20 minutes, ensuring that the temperature reaches a minimum of 35° C. and a maximum of 45° C.

Add the following and mix at high speed for 10 minutes:

Wallkyd 11-029 13.41

Odourless mineral spirits 12.57

G.D.P. 824-0076 titanium white 1.88

Beckosol AX-119 1.31

Allow to cool to ambient temperature, then add:

4% calcium naphthenate 1.05

6% cobalt naphthenate 0.15

Duskin #2 0.07

LumiNova BG-300M 54.80

Luminova phosphorescent pigment is sold by United Mineral and Chemical Corporation from New Jersey.

The rheology modifiers, anti-skinning agents, drying agents, leveling agents, and the like are added to suspend the relatively dense phosphorescent material in the base, and to improve the appearance of the final product.

Once the paint has been allowed to dry, it will be resistant to moisture. I found that the addition of titanium dioxide (titanium white) increases the whiteness of the paint and therefore improves its appearance. It has little adverse effect on the luminescence of the luminescent pigment.

Furthermore, tints of various colors can be used in its composition to provide a color to the luminescent paint. Possible tints include blue, green, as well as yellow or orange. Very dark tints will interfere with the absorption of light, and so are to be avoided.

The paint can be tinted to match many commonly used wall colors and the appearances will be similar to the non-luminescent paint. In general, this paint can be color matched to surrounding walls in ambient light so that it is not apparent except in the dark. Thus signage will not provide an unpleasant appearance when it is not necessary, but if the area becomes dark, it will appear.

What is claimed is:

1. A method of marking luminescent indicia on a surface by:
    applying a tintable, luminescent paint, which paint comprises:
        i) an oil based resin, and
        ii) a plurality of pigments comprising at least one phosphoresent pigment which is an alkali earth oxide aluminate,
        iii) a rheology modifier which keeps phosphorescent pigment in suspension for a sufficient time to apply the paint, wherein the said rheology modifier includes a modified castor oil,
    to the surface, using a stencil.

2. The method of claim 1 in which the paint is tinted to match surrounding paint in ambient light.

3. A method of installing a luminescent exit sign on a surface, not utilizing electricity, by:
    applying a tintable, luminescent paint, which paint comprises:
        i) an oil based resin, and
        ii) a plurality of pigments comprising at least one phosphorescent pigment which is an alkali earth oxide aluminate,
        iv) a rheology modifier which keeps phosphorescent pigment in suspension for a sufficient time to apply the paint, wherein the said rheology modifier includes a modified castor oil,
    to the surface, using a stencil.

4. A method of demarcating such items like fire hose cabinets, door frames, dangerous obstructions, light switch plates and electrical outlets by:
    applying luminescent indicia, comprising:
        a tintable, luminescent paint, which paint comprises:
            i) an oil based resin, and
            ii) a plurality of pigments comprising at least one phosphorescent pigment which is an alkali earth oxide aluminate,
            v) a rheology modifier which keeps phosphoresent pigment in suspension for a sufficient time to apply the paint, wherein the said rheology modifier includes a modified castor oil,
    to the surface, using a stencil.

* * * * *